(12) United States Patent
Fu et al.

(10) Patent No.: US 10,171,012 B2
(45) Date of Patent: Jan. 1, 2019

(54) AIR CONDITIONER AND STARTUP CONTROL METHOD AND SYSTEM FOR OUTDOOR FAN OF THE AIR CONDITIONER

(71) Applicant: Guangdong Welling Motor Manufacturing Co., Ltd., Foshan, Guangdong (CN)

(72) Inventors: Yanchao Fu, Guangdong (CN); Xiaoan Zhao, Guangdong (CN); Jie Sun, Guangdong (CN); Liming Gong, Guangdong (CN)

(73) Assignee: Guangdong Welling Motor Manufacturing Co., Ltd., Foshan (CN)

(*) Notice: Subject to any disclaimer, the term of this patent is extended or adjusted under 35 U.S.C. 154(b) by 2 days.

(21) Appl. No.: 15/504,906

(22) PCT Filed: Aug. 19, 2014

(86) PCT No.: PCT/CN2014/084678
§ 371 (c)(1),
(2) Date: Feb. 17, 2017

(87) PCT Pub. No.: WO2016/026076
PCT Pub. Date: Feb. 25, 2016

(65) Prior Publication Data
US 2017/0264216 A1 Sep. 14, 2017

(51) Int. Cl.
*H02P 1/26* (2006.01)
*F04D 27/00* (2006.01)
(Continued)

(52) U.S. Cl.
CPC .............. *H02P 1/265* (2013.01); *F04D 27/00* (2013.01); *F04D 27/004* (2013.01); *H02P 1/46* (2013.01); *H02P 6/20* (2013.01); *H02P 21/0021* (2013.01)

(58) Field of Classification Search
CPC .. H02P 6/182; H02P 6/20; H02P 6/185; H02P 6/24
See application file for complete search history.

(56) References Cited

U.S. PATENT DOCUMENTS

| | | | | |
|---|---|---|---|---|
| 5,327,053 A | * | 7/1994 | Mann | ...................... H02P 6/182 318/400.04 |
| 2008/0048598 A1 | * | 2/2008 | Shibuya | .................. H02P 6/185 318/400.1 |

(Continued)

FOREIGN PATENT DOCUMENTS

| CN | 102684588 A | 9/2012 |
|---|---|---|
| CN | 103701375 A | 4/2014 |

(Continued)

OTHER PUBLICATIONS

Translation of JP-2013-172492 has been attached.*
International Search Report issued by ISA/CN dated May 21, 2015 for PCT/CN2014/084678.

*Primary Examiner* — Shawki S Ismail
*Assistant Examiner* — Zoheb Imtiaz
(74) *Attorney, Agent, or Firm* — Fish & Richardson P.C.

(57) ABSTRACT

An air conditioner and a startup control method and system for an outdoor fan of the air conditioner. While in a process of charging a bootstrap capacitor in an actuator of a motor of the outdoor fan, an initial rotation state of the motor is detected in real time, and, when charging of the bootstrap capacitor is completed, startup of the motor is correspondingly controlled on the basis of the detected initial rotation state. This allows real time initial startup work state to be acquired when charging of the bootstrap capacitor is completed, thus allowing the motor to be started smoothly, increasing the success rate in starting the motor, and solving the problem of low success rate in starting the motor of an outdoor fan.

7 Claims, 4 Drawing Sheets

(51) Int. Cl.
*H02P 6/20* (2016.01)
*H02P 1/46* (2006.01)
*H02P 21/00* (2016.01)

(56) References Cited

U.S. PATENT DOCUMENTS

| | | | |
|---|---|---|---|
| 2008/0108469 A1* | 5/2008 | Weinschenker | F16H 57/0434 475/72 |
| 2008/0272724 A1 | 11/2008 | Hayashi | |
| 2009/0128074 A1* | 5/2009 | Hu | H02P 6/183 318/400.33 |
| 2010/0141192 A1* | 6/2010 | Paintz | H02P 6/185 318/400.33 |
| 2012/0043919 A1* | 2/2012 | Lee | H02P 6/08 318/400.11 |
| 2013/0015794 A1* | 1/2013 | Wang | H02P 6/188 318/400.11 |
| 2014/0111127 A1 | 4/2014 | Bi | |

FOREIGN PATENT DOCUMENTS

| | | |
|---|---|---|
| CN | 103954009 A | 7/2014 |
| CN | 103954010 A | 7/2014 |
| CN | 103956940 A | 7/2014 |
| CN | 104218857 A | 12/2014 |
| JP | 2012228010 A | 11/2012 |
| JP | 2013-172492 * | 9/2013 |

* cited by examiner

AIR CONDITIONER AND STARTUP CONTROL METHOD AND SYSTEM FOR OUTDOOR FAN OF THE AIR CONDITIONER

TECHNICAL FIELD

The present invention pertains to the technical field of motor starting control and particularly relates to an air conditioner and a method and system for starting control over an outdoor fan thereof.

BACKGROUND

At present, for energy saving and reduction of working noise and cost, permanent magnet synchronous motors adopting a sensorless field oriented control (FOC) policy are massively applied to outdoor fans of air conditioners. Since the outdoor fan of the air conditioner has initial starting working conditions such as pneumatic forward direction rotation (namely forward direction rotation under external wind action), pneumatic counter rotation (namely counter rotation under external wind action) and stillness, in order to improve starting reliability of a motor of the outdoor fan, the motor needs to have a certain starting capability of overcoming the external wind action. For a three-phase permanent magnet synchronous motor suitable for the sensorless FOC policy, a counter emf of the three-phase permanent magnet synchronous motor is of a sinusoidal waveform and contains rotor position information of the motor, thus a rotor position angle and a rotating speed signal can be obtained by detecting the counter emf, and whether the initial starting working condition of the motor is the pneumatic forward direction rotation or the pneumatic counter rotation is determined according to the plus or minus characteristic of the rotating speed signal, so as to determine different starting modes. A motor starting implementation process is as shown in FIG. 1. As regards an existing motor starting control technology, as can be learnt from FIG. 1, no matter what working condition (pneumatic forward direction rotation, stillness or pneumatic counter rotation) is adopted to start the motor, a bootstrap capacitor in a motor driver needs to be charged prior to execution of the steps of performing positioning control over the motor, controlling the motor to perform accelerated rotation in a vector control mode, controlling the motor to enter into a conventional operation state in a vector control mode, etc., and the concrete reasons are described in detail as follows:

A topological structure of a driver of a typical three-phase permanent magnet synchronous motor (PMSM) is as shown in FIG. 2. In practical application, 6 switching tubes and 6 freewheel diodes in FIG. 2 are usually integrated in an intelligent power module (IPM). For simplicity of design, when the IPM is applied to the outdoor fan of the air conditioner, a driving circuit in the IPM is usually of a single power supply control solution; when the single power supply control solution is used, it needs to be guaranteed that a control power supply can provide a correct gate bias voltage for an upper bridge arm switching tube reliably, and a high voltage passing a direct current bus does not flee to a control power supply circuit to burn down components. In the prior art, a sampling bootstrap circuit is one of methods for implementing the aforementioned single power supply control solution. As shown in FIG. 3, the sampling bootstrap circuit comprises a bootstrap resistor $R_{BS}$, a bootstrap diode $D_{BS}$ and a bootstrap capacitor $C_{BS}$. When a lower bridge arm switching tube Kd is connected, a power supply $V_{CC}$ charges the bootstrap capacitor $C_{BS}$ through the bootstrap resistor $R_{BS}$ and the bootstrap diode $D_{BS}$, and a charging loop is as shown in an imaginary line loop as shown in FIG. 3. In a charging process, in order to alleviate pressure over the control power supply $V_{CC}$, the connection of the lower bridge arm switching tube Kd is not continuous and is performed according to a certain duty ratio, and an upper bridge arm switching tube Ku is cut off in the whole course; when the upper bridge arm switching tube Ku is connected, the bootstrap diode $D_{BS}$ performs reverse cut-off to isolate a direct current bus voltage from the power supply $V_{CC}$, so as to prevent the direct current bus voltage from fleeing into the control power supply circuit and burning down the components.

In sum, corresponding starting operations need to be executed on the motor after the bootstrap capacitor in the motor driver is charged, and at this time the initial starting working condition of the motor possibly differs from the working condition detected before the bootstrap capacitor is charged, so that it leads to motor starting failure very easily, and the motor starting success rate is reduced.

SUMMARY OF THE INVENTION

An objective of the present invention is to provide a method for starting control over an outdoor fan of an air conditioner and solve the problem of low motor starting success rate of an outdoor fan in the prior art.

The present invention is implemented in this way: a method for starting control over an outdoor fan of an air conditioner is provided, and a motor of the outdoor fan is driven by a driver. The method for starting control over the outdoor fan of the air conditioner comprises the following steps of:

when a bootstrap capacitor in the driver is charged, detecting an initial rotating state of the motor in real time; and after the bootstrap capacitor is charged, correspondingly controlling the motor to be started according to the detected initial rotating state.

Another objective of the present invention is to provide a system for starting control over an outdoor fan of an air conditioner. A motor of the outdoor fan is driven by a driver. The system for starting control over the outdoor fan of the air conditioner comprises:

a charging and rotation detection module, which is used for detecting an initial rotating state of the motor in real time when a bootstrap capacitor in the driver is charged; and a motor starting control module, which is used for correspondingly controlling the motor to be started according to the initial rotating state detected by the charging and rotation detection module, after the bootstrap capacitor is charged.

A further objective of the present invention is to provide an air conditioner comprising the system for starting control aver the outdoor fan of the air conditioner.

In the present invention, starting control over the outdoor fan of the air conditioner refers to the facts that the initial rotating state of the motor is detected in real time in the process of charging the bootstrap capacitor in the motor driver of the outdoor fan, and after the bootstrap capacitor is charged, the motor is correspondingly controlled to be started according to the detected initial rotating state, so that the real-time initial starting working condition is obtained after the bootstrap capacitor is charged, the motor can be started smoothly, the motor starting success rate is

DETAILED DESCRIPTION OF THE PREFERRED EMBODIMENT

In order to make the objectives, technical solution and advantages of the present invention clearer, the present invention is further described in detail below in combination with accompanying drawings and embodiments. It should be understood that the concrete embodiments described here are only used to describe the present invention and are not used to limit the present invention.

In an existing air conditioner, a motor of an outdoor fan is driven by a driver. The driver comprises an intelligent power module and a bootstrap circuit. The bootstrap circuit comprises a bootstrap capacitor. When the bootstrap capacitor is in a charged state, a lower bridge arm switching tube in the intelligent power module is connected at a corresponding duty ratio according to a received pulse-width modulation signal, the lower bridge arm switching tube is connected at a high level part of the pulse-width modulation signal and cut off at a low level part of the pulse-width modulation signal, while the upper bridge arm switching tube always keeps a cut-off state. It thus can be learnt that the bootstrap capacitor is not charged continuously but charged discontinuously according to switching motions of the lower bridge arm switching tube, and thus a charging mode of the bootstrap capacitor can be seen as a discontinuous charging mode.

Figure 1:
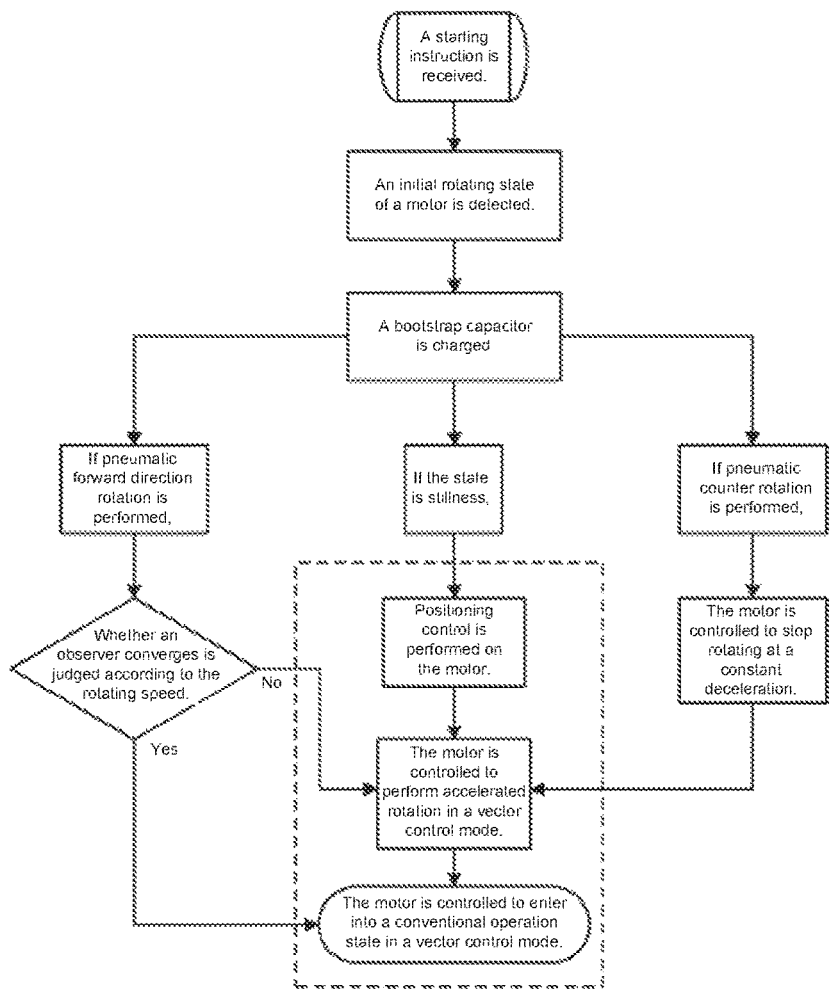
FIG. 1 is an implementation flow chart of an existing motor starting control technology involved in the background art.
Figure 2:
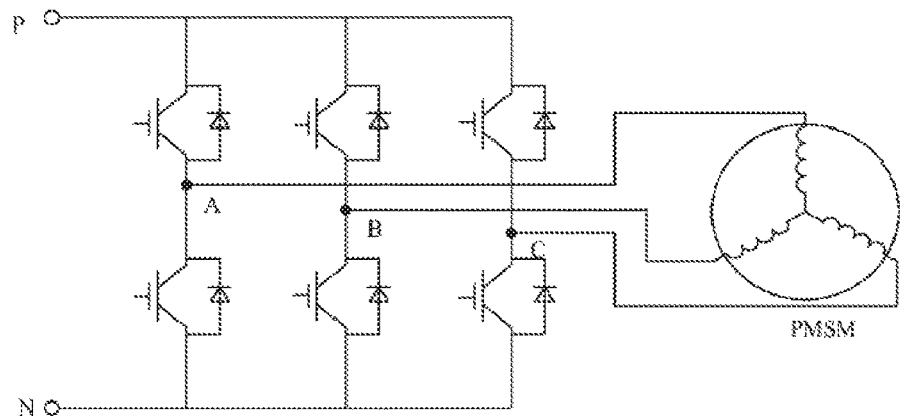
FIG. 2 is a topological structure diagram of a driver of a three-phase permanent magnet synchronous motor involved in the background art.
Figure 3:
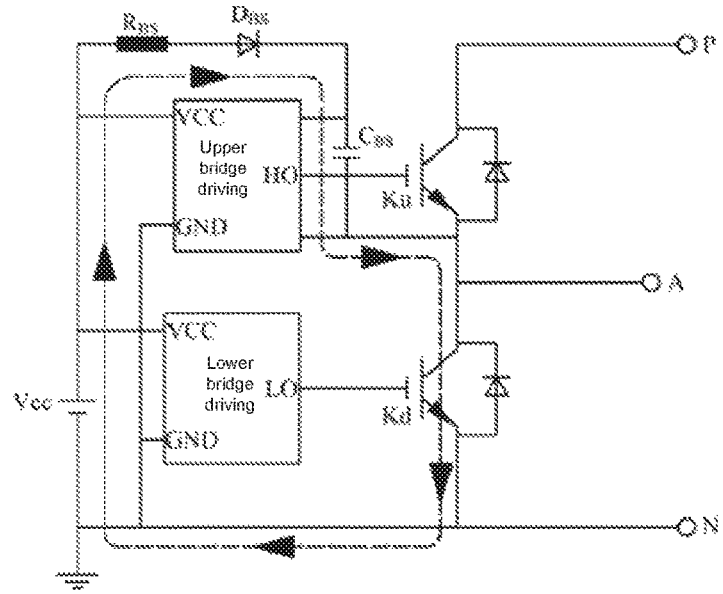
FIG. 3 is a schematic circuit diagram of a sampling bootstrap circuit in a motor driver involved in the background art.
Figure 4:
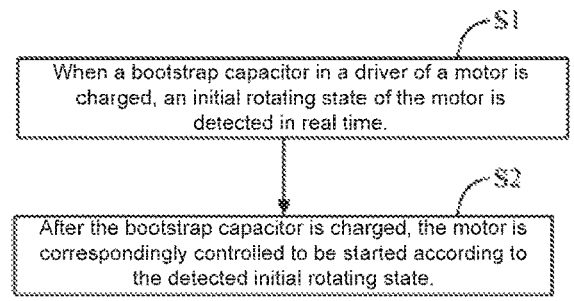
FIG. 4 is an implementation flow chart of a method for starting control over an outdoor fan of an air conditioner provided by the embodiment of the present invention.

FIG. 4 illustrates an implementation flow chart of a method for starting control over an outdoor fan of an air conditioner provided by the embodiment of the present invention. For convenience in description, only a part relevant to the embodiment of the present invention is illustrated, and this part is described in detail as follows:

In Step S1, when the bootstrap capacitor in the driver of the motor is charged, the initial rotating state of the motor is detected in real time.

Concretely, Step S1 comprises the following steps of:

when the lower bridge arm switching tube of the intelligent power module in the driver is connected, charging the bootstrap capacitor; and when the lower bridge arm switching tube of the intelligent power module in the driver is cut off, detecting a counter emf of the motor, and determining the initial rotating state of the motor according to the counter emf.

Figure 5:
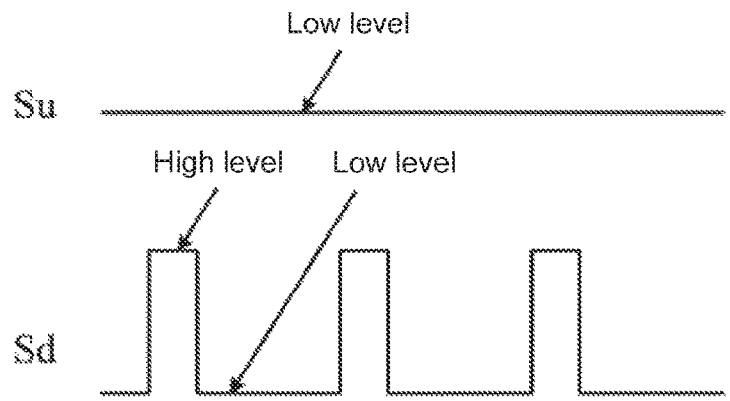
FIG. 5 is a pulse-width modulation signal waveform oscillogram of an upper bridge arm switching tube and a lower bridge arm switching tube of an intelligent power module in a motor driver involved in the method for starting control over the outdoor fan of the air conditioner as shown in FIG. 4.

It needs to be noted that the reason for choosing to detect the counter emf of the motor when the lower bridge arm switching tube is cut off is that switching motions of the upper bridge arm switching tube and the lower bridge arm switching tube may introduce high-frequency clutters, and the high-frequency clutters severely affect detection effects of the counter emf; as a result, in view of the fact that the upper bridge arm switching tube always keeps a cut-off state in the process of charging the bootstrap capacitor (the pulse-width modulation signal Su for the upper bridge arm switching tube is controlled to always keep a low level, as shown in FIG. 5), if a user wants to accurately detect the counter emf of the motor, the counter emf needs to be detected when the lower bridge arm switching tube is cut off (that is, the low level part of the pulse-width modulation signal Sd for the lower bridge arm switching tube is controlled, as shown in FIG. 5), so that the initial rotating state of the motor can be determined accurately according to the counter emf. In accordance with the content mentioned in the background art, the step of detecting the counter emf of the motor and determining the initial rotating state of the motor according to the counter emf concretely comprises the following steps of:

detecting the counter emf of the motor;

obtaining the rotating speed of the motor according to the counter emf; and determining the initial rotating state of the motor according to the plus or minus characteristic of the rotating speed.

When the rotating speed is positive, it is indicated that the initial rotating state of the motor is pneumatic forward direction rotation; when the rotating speed is negative, it is indicated that the initial rotating state of the motor is pneumatic counter rotation; and when the rotating speed is zero, it is indicated that the initial rotating state of the motor is stillness.

In step S2, after the bootstrap capacitor is charged, the motor is correspondingly controlled to be started according to the detected initial rotating state.

Figure 6:
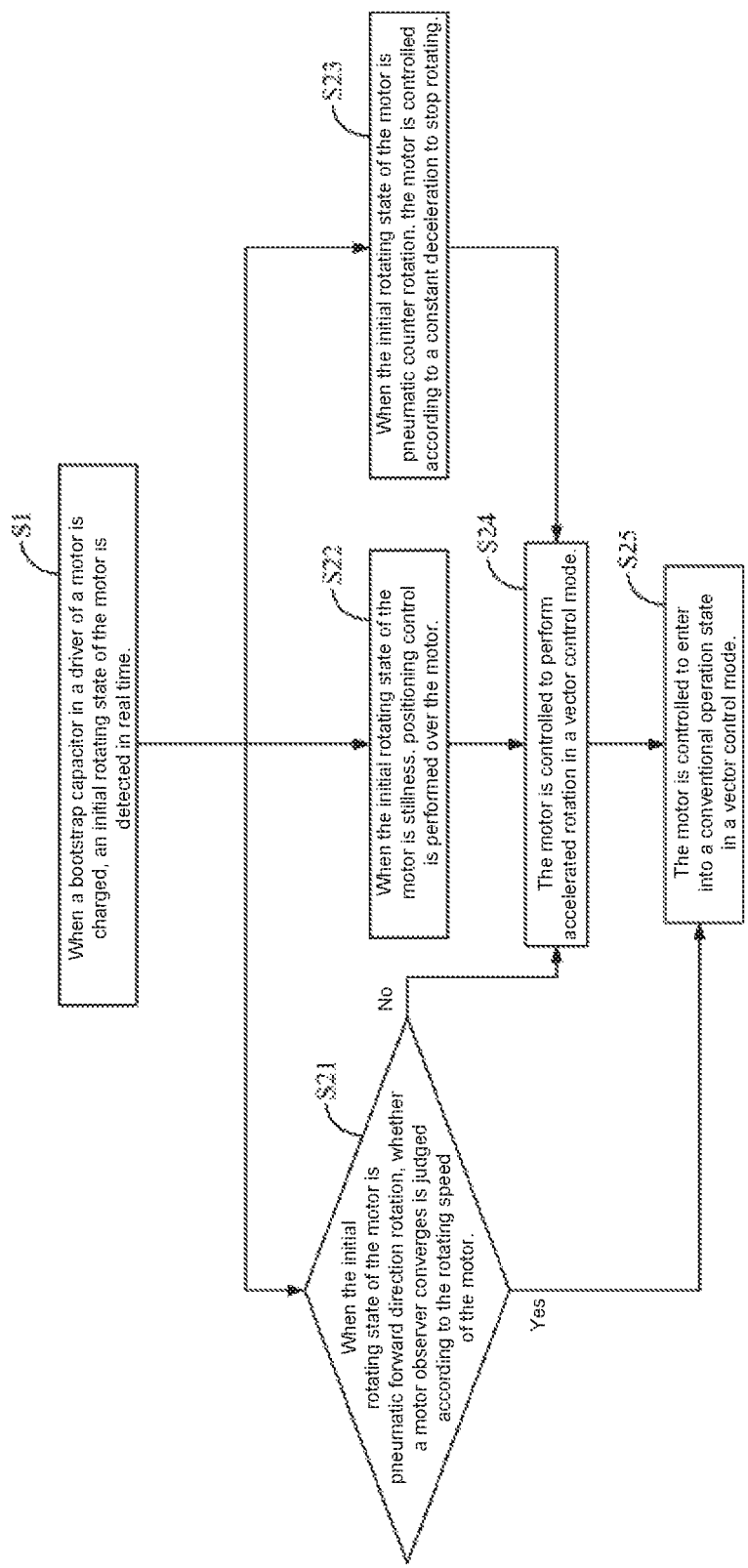
FIG. 6 is a refining flow chart of the method for starting control over the outdoor fan of the air conditioner as shown in FIG. 4.

Concretely, as shown in FIG. 6, in Step S2, the step of correspondingly controlling the motor to be started according to the detected initial rotating state concretely comprises the following steps of:

Step S21: when the initial rotating state of the motor is the pneumatic forward direction rotation, judging according to the rotating speed of the motor whether a motor observer converges; executing Step S25 if the motor observer converges, or else executing Step S24;

Step S22: when the initial rotating state of the motor is stillness, performing positioning control over the motor, and executing Step S24;

Step S23: when the initial rotating state of the motor is pneumatic counter rotation, controlling the motor according to a constant deceleration to stop rotating, and executing Step S24;

Step S24 of controlling the motor to perform accelerated rotation in a vector control mode; and Step S25 of controlling the motor to enter into a conventional operation state in a vector control mode.

It needs to be noted that the step of judging according to the rotating speed of the motor whether the motor observer converges in Step S21, the step of performing positioning control over the motor in Step S22, the step of controlling the motor according to a constant deceleration to stop rotating in Step S23, Step S24 and Step S25 are the same as steps mentioned in the background art, and belong to conventional steps in a conventional starting mode of a three-phase permanent magnet synchronous motor (suitable for the sensorless FOC policy), and thus these steps are no longer repeated.

In sum, the starting control over the outdoor fan of the air conditioner refers to the facts that the initial rotating state of the motor is detected in real time in the process of charging the bootstrap capacitor in the motor driver of the outdoor fan, and after the bootstrap capacitor is charged, the motor is correspondingly controlled to be started according to the detected initial rotating state, so that the real-time initial starting working condition is obtained after the bootstrap capacitor is charged, the motor can be started smoothly, and the motor starting success rate is improved. In addition, due to the fact that the process of detecting the initial rotating state of the motor in real time and the process of charging the bootstrap capacitor are performed simultaneously, the time needed from starting to detect the initial rotating state of the motor to starting the motor is shortened, and an effect of effectively shortening the time required in the whole motor starting process can be achieved.

Figure 7:
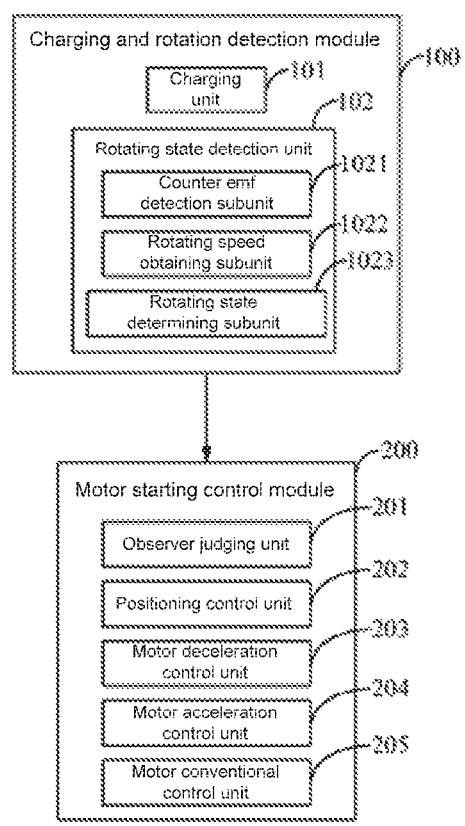
FIG. 7 is a structural schematic diagram of a system for starting control over the outdoor fan of the air conditioner provided by the embodiment of the present invention.

Based on the method for starting control over the outdoor fan of the air conditioner, the embodiment of the present invention further provides a system for starting control over the outdoor fan of the air conditioner. In an existing air conditioner, the motor of the outdoor fan is driven by the driver. As shown in FIG. 7, the system for starting control over the outdoor fan of the air conditioner comprises:

a charging and rotation detection module 100, which is used for detecting an initial rotating state of the motor in real time when a bootstrap capacitor in the driver is charged; and a motor starting control module 200, which is used for correspondingly controlling the motor to be started according to the initial rotating state detected by the charging and rotation detection module 100, after the bootstrap capacitor is charged.

Furthermore, the charging and rotation detection module 100 comprises:

a charging unit 101, which is used for charging the bootstrap capacitor when the lower bridge arm switching tube of the intelligent power module in the driver is connected; and a rotating state detection unit 102, which is used for detecting a counter emf of the motor when the lower bridge arm switching tube of the intelligent power module in the driver is cut off, and determining the initial rotating state of the motor according to the counter emf.

The rotating state detection unit 102 comprises:

a counter emf detection subunit 1021, which is used for detecting the counter emf of the motor;

a rotating speed obtaining subunit 1022, which is used for obtaining the rotating speed of the motor according to the counter emf; and a rotating state determining subunit 1023, which is used for determining the initial rotating state of the motor according to the plus or minus characteristic of the rotating speed.

Furthermore, the motor starting control module 200 comprises:

an observer judging unit 201, a positioning control unit 202, a motor deceleration control unit 203, a motor acceleration control unit 204 and a motor conventional control unit 205, where the observer judging unit 201 is used for judging according to the rotating speed of the motor whether a motor observer converges, when the initial rotating state of the motor is pneumatic forward direction rotation; and when a judgment result is yes, the motor conventional control unit 205 is driven to work; or when the judgment result is no, the motor acceleration control unit 204 is driven to work;

the positioning control unit 202 is used for performing positioning control over the motor when the initial rotating state of the motor is stillness, and driving the motor acceleration control unit 204 to work;

the motor deceleration control unit 203 is used for controlling the motor according to a constant deceleration to stop rotating when the initial rotating state of the motor is pneumatic counter rotation, and driving the motor acceleration control unit 204 to work;

the motor acceleration control unit 204 is used for controlling the motor to perform accelerated rotation in a vector control mode; and the motor conventional control unit 205 is used for controlling the motor to enter into a conventional operation state in a vector control mode.

Due to the fact that the motor deceleration control unit 203, the motor acceleration control unit 204 and the motor conventional control unit 205 control the motor to operate, in practical application, the three units can be combined to be a motor driving circuit so as to perform operation control over the motor.

In sum, the starting control over the outdoor fan of the air conditioner refers to the facts that the charging and rotation detection module 100 detects the initial rotating state of the motor in real time in the process of charging the bootstrap capacitor in the motor driver of the outdoor fan, and after the bootstrap capacitor is charged, the motor starting control module 200 correspondingly controls the motor to be started according to the detected initial rotating state, so that the real-time initial starting working condition is obtained after the bootstrap capacitor is charged, the motor can be started smoothly, and the motor starting success rate is improved. In addition, due to the fact that the process of detecting the initial rotating state of the motor in real time and the process of charging the bootstrap capacitor are performed simultaneously, the time needed from starting to detect the initial rotating state of the motor to starting the motor is shortened, and an effect of effectively shortening the time required in the whole motor starting process can be achieved.

Based on the effect of starting control over the motor of the outdoor fan of the air conditioner by the system for starting control over the outdoor fan of the air conditioner, the embodiment of the present invention further provides an air conditioner comprising the system for starting control over the outdoor fan of the air conditioner.

The above is only preferred embodiments of the present invention and is not intended to limit the present invention. Any modification, equivalent replacement and improvement and the like within the spirit and principle of the present invention shall be included in the protective scope of the present invention.

The invention claimed is:

1. A method for starting control over an outdoor fan of an air conditioner, wherein a motor of the outdoor fan is driven by a driver, and the method for starting control over the outdoor fan of the air conditioner comprises the following steps of:

when a bootstrap capacitor in the driver is charged, detecting an initial rotating state of the motor in real time; and after the bootstrap capacitor is charged, correspondingly controlling the motor to be started according to the detected initial rotating state;

wherein the step of correspondingly controlling the motor to be started according to the detected initial rotating state comprises the following steps:

Step a: when the initial rotating state of the motor is pneumatic forward direction rotation, judging according to the rotating speed of the motor whether a motor observer converges;

executing Step e if the motor observer converges, or else executing Step d;

Step b: when the initial rotating state of the motor is stillness, performing positioning control over the motor, and executing Step d;

Step c: when the initial rotating state of the motor is pneumatic counter rotation, controlling the motor according to a constant deceleration to stop rotating, and executing Step d;

Step d: controlling the motor to perform accelerated rotation in a vector control mode; and Step e: controlling the motor to enter into a conventional operation state in a vector control mode.

2. The method for starting control over the outdoor fan of the air conditioner according to claim 1, wherein the step of detecting the initial rotating state of the motor in real time when the bootstrap capacitor in the driver is charged comprises the following steps of:

when a lower bridge arm switching tube of an intelligent power module in the driver is connected, charging the bootstrap capacitor; and when the lower bridge arm switching tube of the intelligent power module in the driver is cut off, detecting a counter emf of the motor, and determining the initial rotating state of the motor according to the counter emf.

3. The method for starting control over the outdoor fan of the air conditioner according to claim 2, wherein the step of detecting the counter emf of the motor and determining the initial rotating state of the motor according to the counter emf comprises the following steps of:

detecting the counter emf of the motor;

obtaining the rotating speed of the motor according to the counter emf; and determining the initial rotating state of the motor according to the plus or minus characteristic of the rotating speed.

4. A system for starting control over an outdoor fan of an air conditioner, wherein a motor of the outdoor fan is driven by a driver; the system for starting control over the outdoor fan of the air conditioner comprises:

a charging and rotation detection module, which is used for detecting an initial rotating state of the motor in real time when a bootstrap capacitor in the driver is charged; and a motor starting control module, which is used for correspondingly controlling the motor to be started according to the initial rotating state detected by the charging and rotation detection module, after the bootstrap capacitor is charged;

wherein the motor starting control module comprises:

an observer judging unit, a positioning control unit, a motor deceleration control unit, a motor acceleration control unit and a motor conventional control unit, wherein the observer judging unit is used for judging according to the rotating speed of the motor whether a motor observer converges, when the initial rotating state of the motor is pneumatic forward direction rotation; and when a judgment result is yes, the motor conventional control unit is driven to work; or when the judgment result is no, the motor acceleration control unit is driven to work;

the positioning control unit is used for performing positioning control over the motor when the initial rotating state of the motor is stillness, and driving the motor acceleration control unit to work;

the motor deceleration control unit is used for controlling the motor according to a constant deceleration to stop rotating when the initial rotating state of the motor is pneumatic counter rotation, and driving the motor acceleration control unit to work;

the motor acceleration control unit is used for controlling the motor to perform accelerated rotation in a vector control mode; and the motor conventional control unit is used for controlling the motor to enter into a conventional operation state in a vector control mode.

5. The system for starting control over the outdoor fan of the air conditioner according to claim 4, wherein the charging and rotation detection module comprises:

a charging unit, which is used for charging the bootstrap capacitor when the lower bridge arm switching tube of the intelligent power module in the driver is connected; and a rotating state detection unit, which is used for detecting a counter emf of the motor when the lower bridge arm switching tube of the intelligent power module in the driver is cut off, and determining the initial rotating state of the motor according to the counter emf.

6. The system for starting control over the outdoor fan of the air conditioner according to claim 5, wherein the rotating state detection unit comprises:

a counter emf detection subunit, which is used for detecting the counter emf of the motor;

a rotating speed obtaining subunit, which is used for obtaining the rotating speed of the motor according to the counter emf; and a rotating state determining subunit, which is used for determining the initial rotating state of the motor according to the plus or minus characteristic of the rotating speed.

7. An air conditioner, wherein the air conditioner comprises the system for starting control over the outdoor fan of the air conditioner according to claim 4.

* * * * *